Oct. 23, 1928.
R. T. POLLOCK
1,688,830
PROCESS OF CRACKING OIL
Original Filed Dec. 6, 1920
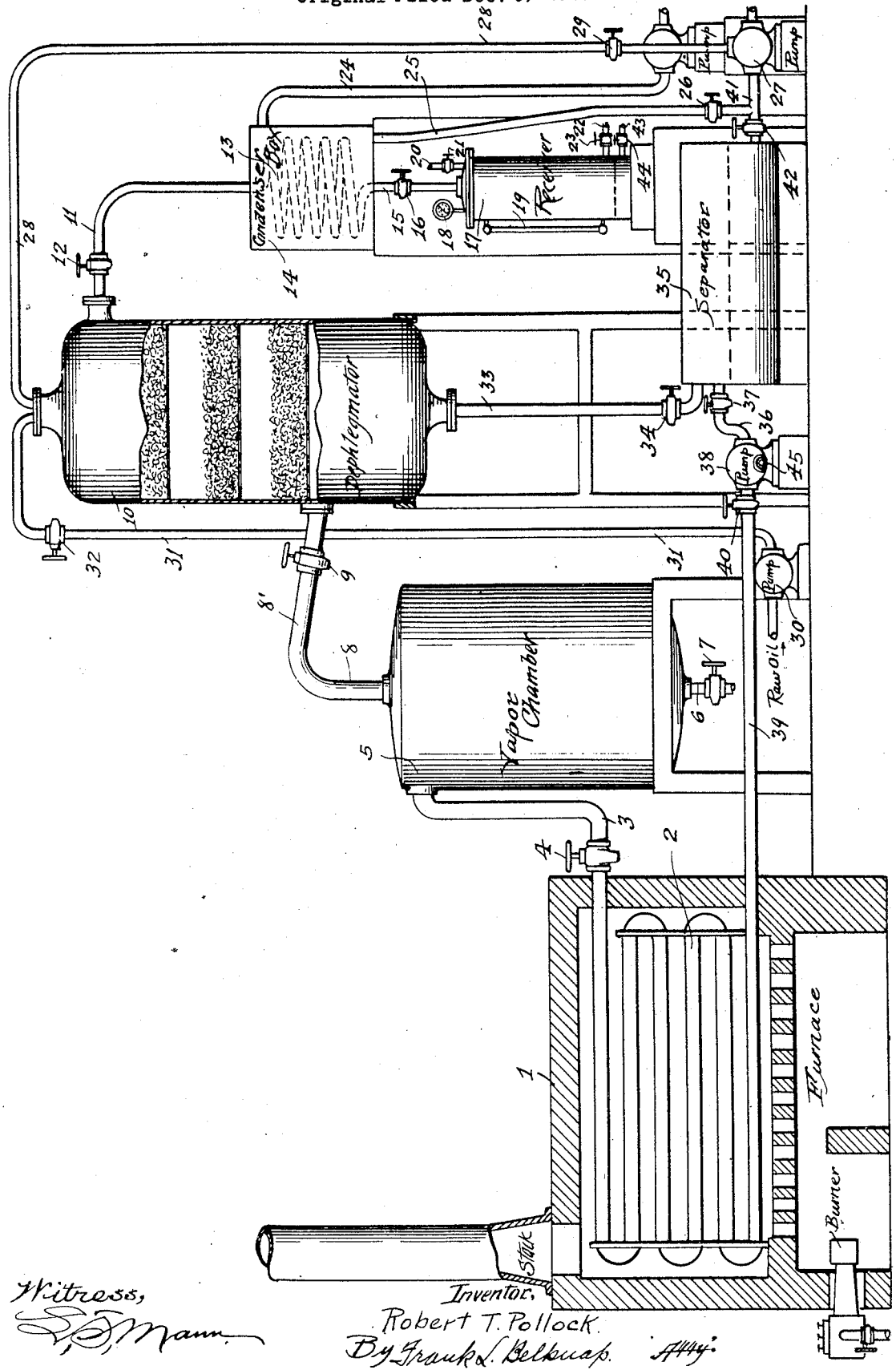
Witness,
S. J. Mann
Inventor,
Robert T. Pollock.
By Frank L. Belknap. Atty.

Patented Oct. 23, 1928.

1,688,830

UNITED STATES PATENT OFFICE.

ROBERT T. POLLOCK, OF BOSTON, MASSACHUSETTS, ASSIGNOR TO UNIVERSAL OIL PRODUCTS COMPANY, OF CHICAGO, ILLINOIS, A CORPORATION OF SOUTH DAKOTA.

PROCESS OF CRACKING OIL.

Application filed December 6, 1920, Serial No. 428,792. Renewed July 16, 1928.

This invention relates to improvements in process of cracking oil and refers more particularly to a process in which the oil is distilled under pressure, the vapors subjected to reflux condensing action whereby a certain portion of them are condensed and this reflux condensate returned to the system for further treatment.

In the present invention, the dephlegmation takes places in the presence of a cooling fluid, as for example, water or steam, the reflux condensate and water delivered to a separation tank and stratified, the reflux oil returned to the system for further treatment and the water drawn off. By means of the present invention, the vapors during the reflux condensing action may be subjected to the purifying action of water or steam.

In the drawing, the single figure is a view partly in section and partly in side elevation of an apparatus suitable for carrying out my process.

Referring particularly to the drawing, 1 designates the furnace, in which is mounted the heating coil 2, the discharge side of which is connected to discharge line 3 having throttle valve 4 to a vapor chamber 5. This vapor chamber 5 is provided with residue drawoff 6, having throttle valve 7 and with vapor outlet pipe 8, having downwardly inclined extension 8' provided with throttle valve 9. The extension 8' connects to the lower end of dephlegmator or reflux condenser 10. This reflux condenser 10 is provided with suitable baffling material as for example, silicious or vitreous material. The dephlegmator is also provided with the vapor outlet pipe 11 having throttle valve 12, which pipe connects to condenser coil 13 seated in condenser box 14. Condenser coil 13 is connected by pipe 15 having throttle valve 16 to the upper end of receiver 17. This receiver 17 is provided with pressure gauge 18, liquid level gauge 19, gas outlet pipe 20 having throttle valve 21 and liquid drawoff pipe 22 having throttle valve 23. Water for supplying the condenser box 14 may be delivered through line 24 and drawn off through line 25 having valve 26. Water is delivered to the upper end of the dephlegmator by pump 27 and line 28 having throttle valve 29. Raw oil may be fed by feed pump 30 and line 31 having throttle valve 32 to the upper end of the dephlegmator. The reflux condensate and water or other cooling fluid may be drawn off through the bottom of the dephlegmator through pipe 33 having valve 34 to the upper end of the separator 35. The upper part of this separator 35 is provided with oil drawoff pipe 36 having throttle valve 37 which is connected to pump 38, which pump discharges into the delivery line 39 having throttle valve 40 and leading to the inlet side of the heating coil. The lower end of the separating chamber is connected by water line 41 having valve 42 to the water pump 27. The lower end of the receiver is also provided with the water drawoff pipe 43 having valve 44.

The arrangement is such that the water which is heavier than the oil can be drawn off either out of the separating tank or out of the receiver. There is a likelihood of water collecting in both places as some of the cooling fluid will pass out in the form of steam through the vapor line 11.

The process may be operated as follows: The raw oil may be fed into the upper end of the dephlegmator and thence through connections described to the heating coil. The oil in the heating coil may be heated to a temperature of say, 750 degrees F., and delivered preferably in liquid phase to the expansion chamber where vaporization takes place. The vapors are subjected to reflux condensation in the dephlegmator and the uncondensed portions pass out to the condenser and receiver. The reflux condensate and preheated raw oil pass to the separating tank where any contained water coming in through the pipe 28 will separate from the oil by gravity while the mixture of raw oil and reflux condensate will be delivered to the charging line. If desired, the raw oil may be introduced directly through line 45 into the pump 38 and the pump 30 cut out. It is to be noted that the water in the separating tank is probably hot, say 180 to 200 degrees F., and will thus not cool the reflux condensate too much. As a matter of fact, if desired, the dephlegmator may be maintained at a temperature of say, 400 degrees F., in which case most of the water will come off as steam. However, some water will probably collect in the separating tank. The process may be carried out under a pressure of say, 150 pounds throughout the system or if desired, a differential pressure may be maintained on the system, as for example, a higher pressure on the coil than on the expansion chamber.

I claim as my invention:

1. A process of cracking oil, consisting in distilling the oil under pressure to cause substantial vaporization, subjecting the generated vapors to a dephlegmating and condensing action, utilizing water and fresh charging oil as a dephlegmating medium by introducing them to the dephlegmating stage in direct physical contact with the vapors, separating the reflux condensate and charging oil from the water and returning the mixture to the still for further treatment, and maintaining a pressure on the entire system substantially above atmospheric.

2. A continuous process for cracking hydrocarbon oil, consisting in subjecting the oil to cracking conditions of heat and pressure in a heating zone, in passing the evolved vapors through a dephlegmator wherein they are caused to physically commingle with incoming charging oil and a supply of water, in passing the charging oil, together with the reflux condensate separated from the vapors in said dephlegmator and the unvaporized water to a separator from which the water is withdrawn, in passing mixed reflux condensate and charging oil from said separator to said heating zone, in taking off dephlegmated vapors from said dephlegmator, in condensing such vapors and collecting the resulting distillate.

3. A process for cracking hydrocarbon oil comprising subjecting the oil to cracking conditions of heat and pressure in a heating zone, liberating vapors from the heated oil, passing such vapors through a dephlegmator wherein they are caused to physically commingle with charging oil and water, passing oil and water constituents from the dephlegmator to a separator, withdrawing water from said separator and passing the oil constituents from said separator to said heating zone, and removing vapors from the dephlegmator for condensation.

ROBERT T. POLLOCK.